United States Patent Office 2,863,398
Patented Dec. 9, 1958

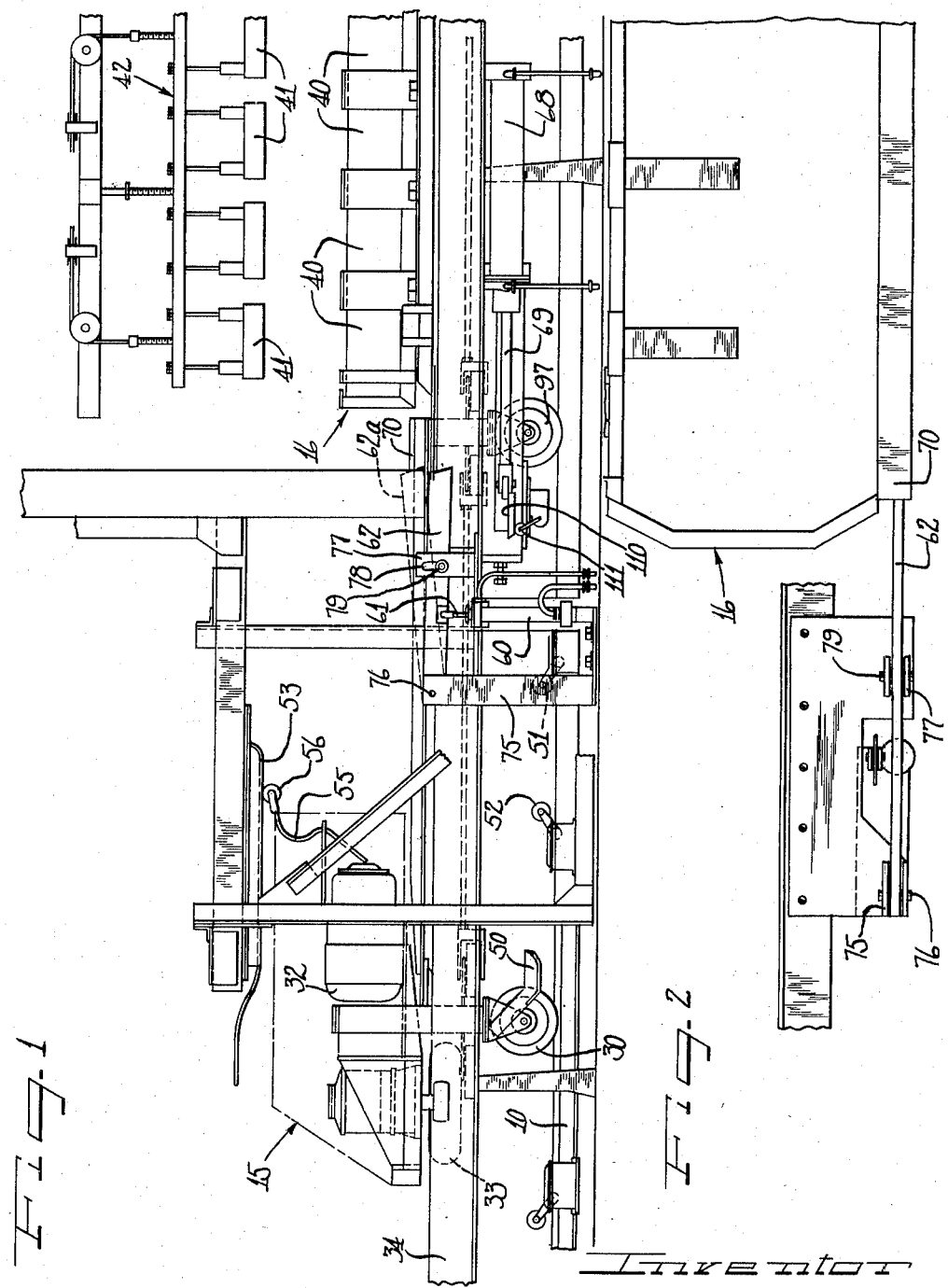
Dec. 9, 1958     A. G. GRANATH     2,863,398
INDEXING AND CONVEYING SYSTEM FOR FOUNDRIES
Filed Aug. 2, 1954     3 Sheets-Sheet 1
Inventor
Axel G. Granath

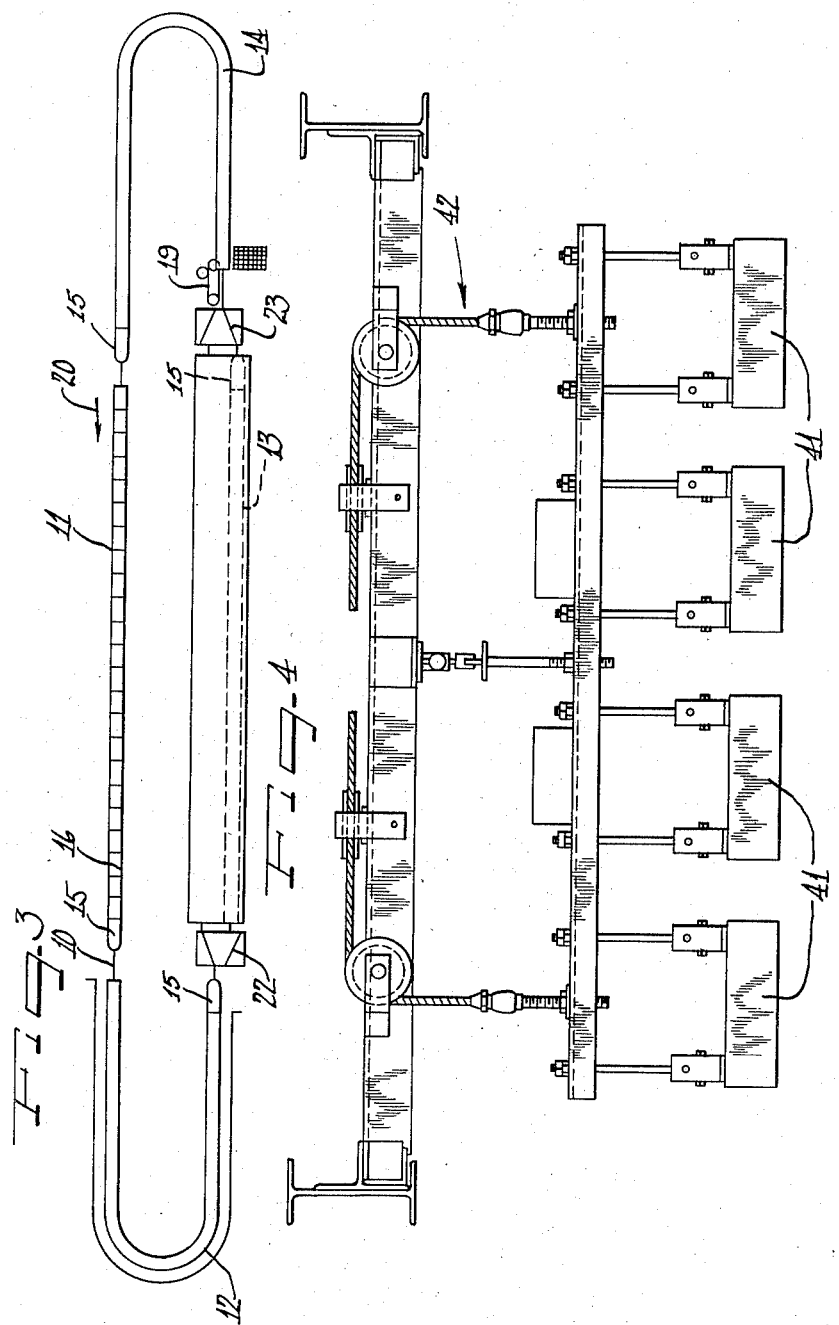

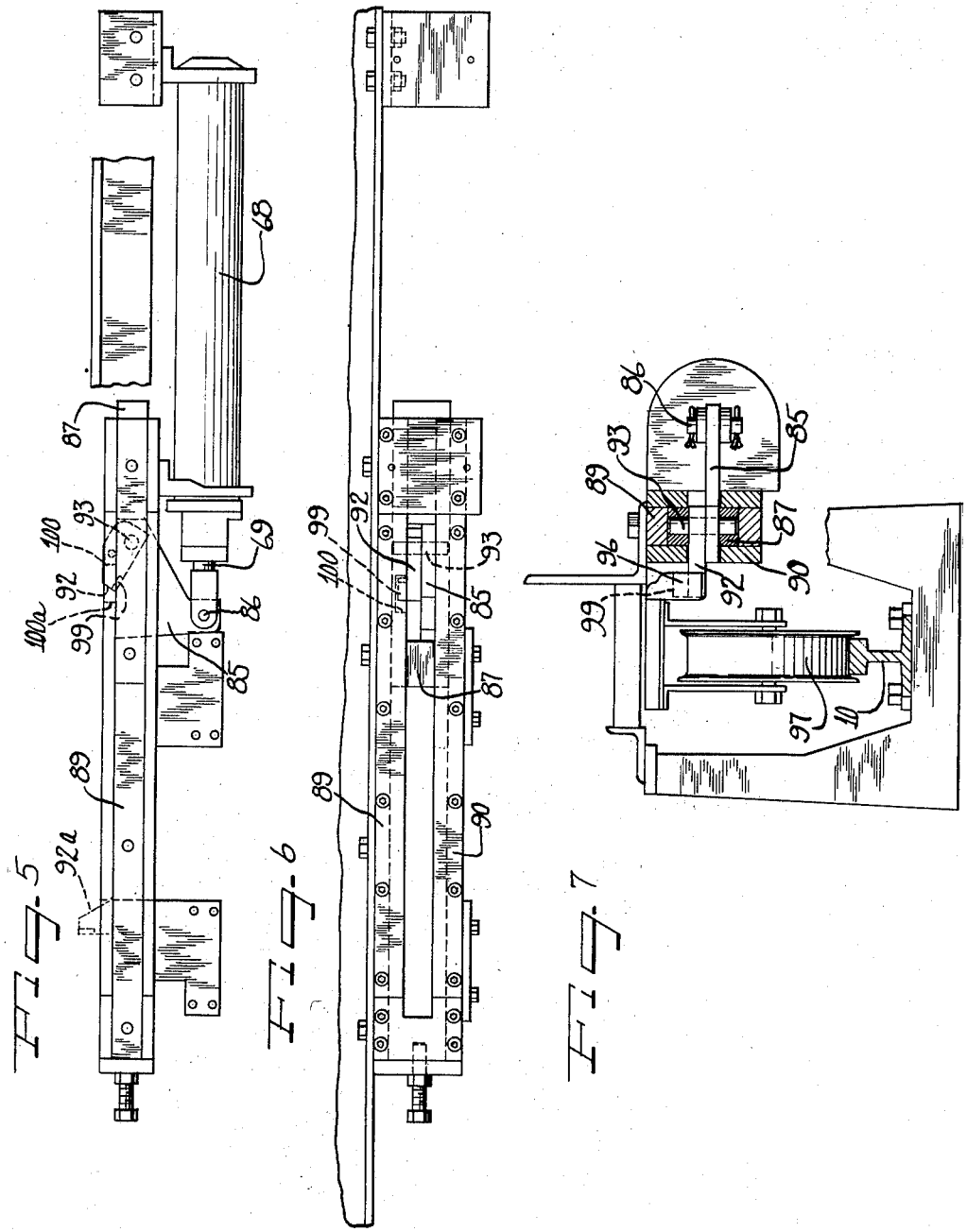

2,863,398

INDEXING AND CONVEYING SYSTEM FOR FOUNDRIES

Axel G. Granath, Chicago, Ill., assignor to Herbert Simpson Corporation, Chicago, Ill., a corporation of Illinois Application August 2, 1954, Serial No. 447,050

21 Claims. (Cl. 104—162)

This invention relates to a mold conveyor system, and particularly to a novel indexing mechanism for accurately positioning a mold conveyor at a predetermined station.

It is an object of the present invention to provide a novel and improved mold conveying system.

It is a further object of the present invention to provide a novel indexing system for accurately positioning a mold conveyor at a selected station.

It is still another object of the present invention to provide a novel indexing system particularly adapted to automatic molding machines for precisely positioning a mold conveyor at the various stations of the machine.

It is another and further object of the present invention to provide an indexing mechanism which is operated automatically by the position of the conveyor as the conveyor moves toward a selected station.

Other objects, features and advantages of the present invention will be more fully apparent from the following detailed description, taken in conjunction with the accompanying drawings, in which:

Figure 1 is a somewhat diagrammatic side elevational view illustrating an indexing mechanism for positioning a mold conveyor at a pouring zone;

Figure 2 is a fragmentary enlarged top plan view illustrating the operation of the stop mechanism in positioning the conveyor at a selected station;

Figure 3 is a diagrammatic top plan view illustrating a simplified layout of a mold conveying system to which the indexing mechanism of the present invention may be applied;

Figure 4 is a fragmentary enlarged elevation view illustrating the weight setting mechanism shown schematically in Figure 1;

Figure 5 is a fragmentary side elevational view illustrating portions of the novel indexing mechanism of the present invention;

Figure 6 is a fragmentary top plan view of the structure of Figure 5; and

Figure 7 is a fragmentary transverse sectional view of the structure of Figure 5, but illustrating the pusher mechanism in extended position and in engagement with the conveyor.

As shown on the drawings:

The indexing mechanism of the present invention may suitably be employed with a mold conveyor system such as illustrated in Patent No. 2,229,492. Reference is made to said patent for a disclosure of the overall mold conveying system. As indicated schematically in Figure 3, the mold conveying system may comprise a monorail conveyor track 10 having a plurality of mold conveyor trains 11, 12, 13 and 14 movable therealong. The trains may each comprise an electric drive car 15 and a plurality of cars such as 16 for carrying the molds. Trains 11, 12 and 13 are shown as disposed respectively at the molding, pouring and cooling zones or stations of the system. The trains in these zones are driven by the electric drive cars at the head of each train. The train 14 is illustrated as being at the shake-out station and a variable speed caterpillar drive 19 is provided for moving the train 14 slowly through the shake-out station, while the trains in the other stations are at rest. When the train 14 has passed through the shake-out station, the train 14 will acuate a master limit switch which energizes the bus bars and starts all the trains simultaneously whereupon each train moves in the direction of the arrow 20 in Figure 3 to the next station. It will be understood that if desired, more than one train may be in the cooling section at a given time and switch means indicated at 22 and 23 may be provided for switching successive trains to successive track sections in the cooling zone.

As illustrated in Figure 1, the monorail 10 may have a wheel 30 of the drive car 15 riding thereon. The drive car 15 impels itself by means of a motor 32 driving a tire 33 engaging the stationary drive rail 34. The cars such as 16 in Figure 1 carry a plurality of molds 40 which are to receive weights 41 from a weight-setting device 42. The weight-setting device is shown in some detail in Figure 4, but since the details thereof form no part of the present invention, a specific detailed description is deemed unnecessary. The weight-setting device is operative by means of a horizontal air cylinder (not shown) to lower the weights 41 into operative relation to the respective molds 40 when the train is accurately positioned at the pouring station.

The indexing mechanism of the present invention will now be described as it might be applied to the precise positioning of the conveyor in relation to the weight-setting device 42. However, it will be understood that the indexing mechanism is applicable to the precise positioning of mold conveyors at any other desired station, such as the shake-out, or mold-setting station.

As the train moves from the molding zone into the pouring zone shown in Figure 1, a limit switch actuator 50 carried by the train adjacent the wheel 30 actuates a pouring zone stop limit switch 51 which cuts off power on the bus bars. The train brake is then automatically applied; however the momentum of the trains causes it to continue a sufficient distance to actuate a limit switch 52 which starts the indexing mechanism in operation, and then to engage a cam 53 which mechanically releases the train brake by means of a release lever 55 having a cam follower 56 thereon.

Actuation of the limit switch 52 by the actuator 50 actuates suitable relays and solenoid valves to apply air pressure to the lower end of stop cylinder 60 of the indexing mechanism to raise piston 61, thus raising the stop bar 62 to its dotted position indicated at 62a. Actuation of the limit switch 52 also results in the application of pressure to the pusher cylinder 68 to extend the piston 69. The piston 69 serves to move the conveyor train until the flange 70 (Figure 2) on the car 16 engages the stop bar 62. The piston 69 and stop bar 62 thus cooperate to accurately position the molds 40 in relation to the weights 41.

Referring to Figures 1 and 2 it will be observed that the stop bar 62 is pivotally mounted by means of a bracket 75 and pin 76 and is guided for pivotal movement by means of a second bracket 77 having an arcuate slot 78 which receives a pin 79 carried by the stop bar 62.

The specific structure of the pusher or shifting assembly including the cylinder 68 and piston 69 will be readily understood by reference to Figures 5, 6 and 7.

As therein shown, the piston 69 is secured to a plate 85 by means of a pin 86. The plate 85 has a guide block 87 secured therewith for horizontal sliding movement in guideways 89 and 90. An engagement lug 92 is pivotally carried on the plate 85 by means of a pin 93 so that the engagement lug 92 is pivotal about the pin 93 from the retracted position indicated in dotted outline in Figure 5 to the extended position indicated in dot-dash outline at 92a in Figure 5 and clearly shown in Figure 7. In extended position, the engagement lug 92 is disposed in the path of movement of the conveyor so as to engage an abutment flange 96 carried by the conveyor train adjacent the wheel 97 between the drive car and the first mold conveying car.

It will be understood that, with the piston 69 in the retracted position shown in Figure 5, the engagement lug 92 will be pivoted inwardly about pin 93 to its retracted position as the wheel 97 moves past the lug. To extend the lug again when the pusher is energized, the lug 92 is provided with a projection 99 which cooperates with a cut out portion 100 in the guide 89 to move the lug 92 into its extended position as the piston 69 is extended from the cylinder 68. Any suitable means may be provided for limiting the inward pivoting of lug 92 to maintain the projection 99 in the operative relation to the slot 100. The forward edge 100a (Figure 5) may be inclined so as to better engage the projection 99 and guide the same out of slot 100 as plate 85 is advanced by cylinder 68.

At the end of the pusher stroke of the piston 69, an extension 110 (Figure 1) of the piston 69 actuates a limit switch 111 for operating solenoid valves which in turn lower the weights 41 by means of the horizontal air cylinder (not shown).

While the molds are being poured, the train 14 in the shake-out zone in Figure 3 moves slowly through the shake-out and thereafter actuates a limit switch which simultaneously returns pusher piston 69 and lowers stop bar 62 to the position shown in solid outline in Figure 1 to clear the flange 70, Figure 2, of the conveyor. As the train in the shake-out zone continues, it may actuate a limit switch which sounds a whistle and starts the weights 41 upward. As the train continues and actuates a still further limit switch, the train in the shake out zone will be stopped if all the weights are not up. If all the weights are up, however, the train 14 continues and finally actuates a master limit switch which energizes the bus bars and starts all the trains.

From the above description, it will be understood that the present invention contemplates a mold conveying system wherein a mold conveyor, such as train 15, 16 is moved along a predetermined path such as determined by the rail 10, the conveyor being moved to a general position in advance of a predetermined station, such as the general position of the train after the train actuator 50 has passed the limit switch 52. After the conveyor has reached this general position, the conveyor is substantially stopped.

The brakes are then released and the cylinder 68 is actuated to move the conveyor toward the predetermined station, the stop bar 62 moving into the path of movement of the conveyor. The conveyor is thus precisely positioned at the predetermined station by means of an opposition between a rigidly, and precisely positioned stop means and a resiliently urged conveyor shifting means.

If the conveyor is moved step-by-step, the stop bar 62 may be coordinated with one of the steps of the conveyor to exactly determine the position of the conveyor at the end of such stepping movement without the need for a separate conveyor shifting means such as the piston 69.

It will be apparent that many modifications and variations may be made in the disclosed embodiment without departing from the scope of the novel concepts of the present invention.

I claim as my invention:

1. A mold conveying system comprising a conveyor movable along a predetermined path for transporting molds toward a predetermined station, means for moving said conveyor to a general position in the region of said predetermined station, pusher means operable separately from said moving means and reciprocably mounted adjacent said path of movement, engaging means carried by said pusher means and movable from a retracted position out of said path of movement to an extended position in said path of movement of said conveyor, cooperating abutment means carried by said conveyor and disposed for engagement by said engaging means when said conveyor has moved to said general position, said pusher means being movable toward an extended position to move said engagement means into engagement with said abutment means and thereby to move said conveyor along said predetermined path toward said predetermined station, means for rendering the moving means ineffective and the pusher means effective as the conveyor reaches said general position, and stop means movable into the path of movement of said conveyor and operative to engage said conveyor when the conveyor has reached said predetermined station to precisely position said conveyor at said predetermined station.

2. A mold conveying system comprising a conveyor movable along a predetermined path for transporting molds toward a predetermined station, means for moving said conveyor to a general position in the region of said predetermined station, non-positive type driving means driven separately from said moving means and movable into engagement with said conveyor when the conveyor has been moved into said general position for advancing said conveyor from said general position toward said predetermined station along said predetermined path, means for rendering the moving means ineffective and the driving means effective as the conveyor reaches said general position, stop means mounted adjacent said path of movement and movable from a retracted position out of the path of movement to an extended position, and abutment means carried by said conveyor and movable into engagement with said stop means in extended position precisely when said conveyor has reached said predetermined station, said stop means being operative to oppose further movement of said conveyor by said driving means to position said conveyor precisely at said predetermined station.

3. A mold conveying system comprising a conveyor movable along a predetermined path for transporting molds toward a predetermined station, means for moving said conveyor to a general position in the region of said predetermined station, non-positive type drive means operable independently of said moving means and reciprocably mounted adjacent said path of movement, engaging means carried by said drive means and movable from a retracted position out of said path of movement to an extended position in said path of movement, cooperating abutment means carried by said conveyor and disposed for engagement by said engaging means in extended position when said conveyor has moved to said general position, said drive means being movable to move said engagement means into engagement with said abutment means and to move said conveyor along said predetermined path toward said predetermined station, means for rendering the moving means ineffective and the drive means effective as the conveyor reaches said general position, stop means mounted adjacent said path of movement and movable from a retracted position out of the path of movement to an extended position in the path of movement, and abutment means carried by the conveyor and movable into engagement with said stop means precisely when said conveyor has reached said predetermined position, said stop means being operative to oppose further movement of said drive means to position said conveyor precisely at said predetermined station.

4. A mold conveying system comprising a conveyor movable along a predetermined path for transporting molds toward a predetermined station, limit switch means disposed for coaction with said conveyor to brake said conveyor in a general position in advance of said predetermined station, means to release the last named means when said conveyor reaches said general position, shifting means movable into engagement with said conveyor when said conveyor has reached said general position for moving said conveyor along said predetermined path to said predetermined station, stop means movable to an extended position in the path of said conveyor and arranged in extended position to engage said conveyor when the conveyor reaches said predetermined station, and limit switch means for actuating said shifting means and said stop means when said conveyor reaches said general position, said shifting means and said stop means cooperating to precisely position said conveyor at said predetermined station.

5. Indexing mechanism for positioning a mold conveyor at a predetermined station comprising non-positive drive means engageable with said conveyor for shifting the same along a predetermined path toward said predetermined station, limit switch means for actuating said drive means only when said conveyor has moved to a predetermined general position in the region of said predetermined station, and stop means movable into said predetermined path of said conveyor for positively stopping said conveyor at the predetermined station as the conveyor is moved toward said predetermined station by said non-positive drive means, whereby the conveyor is held between the non-positive drive means and the stop means.

6. Indexing mechanism for positioning a mold conveyor at a predetermined station, comprising non-positive drive means engageable with said conveyor for shifting the same along a predetermined path toward said predetermined station, stop means movable into said predetermined path of said conveyor for positively stopping said conveyor at the predetermined station, whereby the conveyor is held at the predetermined station between the drive means and the stop means, and limit switch means actuated by said conveyor as the same approaches said predetermined station for actuating said stop means to move it into said predetermined path of said conveyor.

7. Indexing mechanism for positioning a mold conveyor at a predetermined station, comprising non-positive type drive means engageable with said conveyor for shifting the same along a predetermined path towards said predetermined station, stop means movable into said predetermined path of said conveyor for positively stopping said conveyor at the predetermined station, and limit switch means actuated by said conveyor as the same approaches said predetermined station for actuating said drive means to shift said conveyor along said predetermined path and for actuating said stop means to move it into said predetermined path of said conveyor.

8. A mold conveying system comprising a conveyor movable along a predetermined path for transporting molds to a predetermined station, means operated by said conveyor in its movement along said predetermined path for braking said conveyor at a general position in advance of said predetermined station, means for releasing said braking means when said conveyor reaches said general position, shifting means movable into engagement with said conveyor when said conveyor has reached said general position for moving said conveyor along said predetermined path to said predetermined station, and stop means movable into said predetermined path for positively engaging and positioning said conveyor at said predetermined station.

9. A mold conveying system comprising a conveyor movable along a predetermined path for transporting molds to a predetermined station, means including an element disposed in the predetermined path of said conveyor and engageable by said conveyor for braking said conveyor at a general position in advance of said predetermined station, means for releasing said braking means when said conveyor is in said general position, shifting means movable into engagement with said conveyor when the latter has reached said general position for moving said conveyor along said predetermined path from said general position to said predetermined station, stop means movable to an extended position in the path of said conveyor and arranged in extended position to engage said conveyor when the latter reaches said predetermined station, and means including a limit switch engaged by said conveyor during movement along said predetermined path for actuating said shifting means to move said conveyor into engagement with said stop means, thereby to position said conveyor precisely at said predetermined station.

10. A mold conveying system comprising a conveyor movable along a predetermined path for transporting molds to a predetermined station, means including an element positioned in the predetermined path of said conveyor and engageable by said conveyor for braking said conveyor at a general position in advance of said predetermined station, means for releasing said braking means when said conveyor is in said general position, shifting means movable into engagement with said conveyor when the latter has reached said general position for moving said conveyor along said predetermined path from said general position to said predetermined station, stop means movable to an extended position in the path of said conveyor and arranged in extended position to engage said conveyor when the latter reaches said predetermined station, and means including a limit switch engaged by said conveyor during movement along said predetermined path for moving said stop means to its extended position whereby said shifting means moves said conveyor against said stop means and positions it precisely at said predetermined station.

11. Indexing mechanism for positioning at a predetermined station a mold conveyor train of the type having a plurality of interconnected cars, comprising means for moving said train along a predetermined path, stop means movable into engagement with one of the cars of the train for precisely positioning said train at said predetermined station, and means including mechanism engaged by a car in said train preceding said one car for actuating said stop means to move it into the predetermined path of movement of the train.

12. Indexing mechanism for positioning at a predetermined station a mold conveyor train of the type having a plurality of interconnected cars, comprising means for moving said train along a predetermined path, stop means movable into engagement with one of the cars of the train for precisely positioning said train at said predetermined station, and means including a limit switch engaged by a car in said train preceding said one car for actuating said stop means to move it into the predetermined path of movement of the train.

13. Indexing mechanism for positioning at a predetermined station a mold conveyor train of the type having a plurality of interconnected cars, comprising means for moving said train along a predetermined path to a general position in advance of said predetermined station, shifting means driven separately from said moving means for advancing said train along said predetermined path from said general position to said predetermined station, stop means movable into engagement with one of the cars of the train for precisely positioning said train at said predetermined station, and means incuding mechanism engaged by a car in said train preceding said one car for actuating said stop means to move it into the predetermined path of movement of the train so that the train is precisely positioned at said predetermined station by cooperation between said shifting means and said stop means.

14. Indexing mechanism for positioning at a predetermined station a mold conveyor train having a plurality of interconnected cars, comprising means for moving said train along a predetermined path to a general position in advance of said predetermined station, shifting means driven separately from said moving means for advancing said train along said predetermined path from said general position to said predetermined station, stop means movable into engagement with one of the cars of the train for precisely positioning said train at said predetermined station, and means including at least one limit switch engaged by a car in said train preceding said one car for actuating said shifting means and said stop means in order to position the train at said predetermined station.

15. Indexing mechanism for positioning at a predetermined station a mold conveyor train of the type having a plurality of interconnected cars comprising means for moving said train along a predetermined path, brake means actuated by one of the cars in said train for braking said train at a general position in advance of said predetermined station, means for releasing said brake means when said train reaches said general position, means for moving said train from said general position along said predetermined path, stop means movable into engagement with a car in said train succeeding said one car for precisely positioning said train at said predetermined station, and means including mechanism engaged by said one car for moving said stop means into the predetermined path of movement of said train to engage said succeeding car.

16. Indexing mechanism for positioning at a predetermined station a mold conveyor train of the type having a plurality of interconnected cars comprising means for moving said train along a predetermined path, brake means actuated by one of the cars in said train to brake said train at a general position in advance of said predetermined station, means for releasing said brake means when said train reaches said general position, shifting means driven separately from said moving means for advancing said train from said general position to said predetermined station along said predetermined path, stop means movable into engagement with a car in said train succeeding said one car for precisely positioning said train at said predetermined station, and means including mechanism engaged by said one car for moving said stop means into the predetermined path of movement of said train to engage said succeeding car.

17. Indexing mechanism for positioning at a predetermined station a mold conveyor train of the type having a plurality of interconnected cars comprising means for moving said train along a predetermined path, brake means actuated by one of the cars in said train to brake said train at a general position in advance of said predetermined station, means for releasing said brake means when said train reaches said general position, shifting means driven separately from said moving means for advancing said train from said general position along said predetermined path, stop means movable into engagement with a car in said train succeeding said one car for precisely positioning said train at said predetermined station, and means engaged by said one car for moving said stop means into the predetermined path of movement of said train to engage said succeeding car and for actuating said shifting means, thereby to position said train between said stop means and said shifting means at said predetermined station.

18. A conveying system for positioning at a predetermined station a mold conveyor, said system comprising a first drive means for moving said conveyor along a predetermined path to a preselected position, a second non-positive type drive means operable separately from the first drive means for engaging the conveyor to move it from said position towards said predetermined station, stop means movable into and out of the path of movement of the conveyor, means operated by said conveyor in its movement along said predetermined path to said position for rendering the first drive means ineffective to drive said conveyor, for rendering the second drive means automatically effective to move said conveyor and for automatically moving said stop means into the path of movement of the train for positively stopping said conveyor at said predetermined station, whereby the conveyor is held between the non-positive drive means and the stop means.

19. A conveying system for positioning at a predetermined station a mold conveyor of the type having a plurality of interconnected cars, said system comprising a first drive means for moving said conveyor along a predetermined path to a preselected position, brake means on at least one of said cars, a second drive means operable separately from the first drive means for engaging the conveyor to move it from said position towards said predetermined station, stop means movable into and out of the path of movement of the conveyor, means operated by said conveyor in its movement along said predetermined path to said position for rendering the first drive means ineffective to drive said conveyor, for automatically applying said brake means, for thereafter releasing said brake means to permit movement of the conveyor by the second drive means, for rendering the second drive means automatically effective to move said conveyor and for automatically moving said stop means into the path of movement of the train for positively stopping said conveyor at said predetermined station.

20. A conveying system for positioning at a predetermined station a mold conveyor, said system comprising a first drive means on one of said cars for moving said conveyor along a predetermined path to a preselected position, means for braking said conveyor, a second drive means operable separately from the first drive means for engaging the conveyor to move it from said position towards said predetermined station, stop means movable into and out of the path of movement of the conveyor, means operated by said conveyor in its movement along said predetermined path to said position for rendering the first drive means ineffective to drive said conveyor, for automatically applying said braking means, for thereafter releasing said braking means to permit movement of the train by said second drive means, for rendering the second drive means automatically effective to move said conveyor and for automatically moving said stop means into the path of movement of the train for positively stopping said conveyor at said predetermined station.

21. A conveying system for positioning at a predetermined station a mold conveyor, said system comprising a first drive means for moving said conveyor along a predetermined path to a preselected position, a second non-positive drive means operable separately from the first drive means for engaging the conveyor to move it from said position towards said predetermined station, stop means movable into and out of the path of movement of the conveyor, braking means for said conveyor, and means operated by said conveyor in its movement along said predetermined path to said position for rendering the first drive means ineffective to drive said conveyor, for automatically applying said braking means, for thereafter releasing said braking means to permit movement of the train by said second drive means, for rendering the second drive means automatically effective to move said conveyor, and for automatically moving said stop means into the path of movement of the train for positively stopping said conveyor at said predetermined station where it is held between the non-positive drive means and the stop means.

References Cited in the file of this patent

UNITED STATES PATENTS

| | | |
|---|---|---|
| 1,641,178 | Little | Sept. 6, 1927 |
| 1,706,211 | Coffey | Mar. 16, 1929 |
| 1,819,017 | Drake | Aug. 18, 1931 |
| 2,035,359 | Anjeskey | Mar. 24, 1936 |
| 2,461,770 | Puccinelli | Feb. 15, 1949 |

FOREIGN PATENTS

| | | |
|---|---|---|
| 699,813 | Great Britain | Nov. 18, 1953 |